United States Patent [19]
Cole

[11] 4,177,897
[45] Dec. 11, 1979

[54] WOUND ROLL OF FIBROUS MATERIAL

[76] Inventor: Terrell A. Cole, 2820 Sherwood Dr., San Bruno, Calif. 94066

[21] Appl. No.: 904,975

[22] Filed: May 11, 1978

Related U.S. Application Data

[62] Division of Ser. No. 700,012, Jun. 25, 1976, Pat. No. 4,097,983.

[51] Int. Cl.² ............................................. B65D 85/67
[52] U.S. Cl. ........................................ 206/389; 242/1
[58] Field of Search ............... 206/389, 391, 412, 55; 53/28; 428/133, 131; 225/106; 156/220; 242/1; 229/48 R; 29/521

[56] References Cited

U.S. PATENT DOCUMENTS

| 745,612 | 12/1903 | Hoberg | 206/389 |
|---|---|---|---|
| 1,958,455 | 5/1934 | Ware | 229/48 R |
| 2,049,756 | 8/1936 | Asmussen et al. | 53/28 |
| 2,612,992 | 10/1952 | Tinkham | 242/1 |
| 2,847,086 | 8/1958 | Muller | 428/133 |
| 3,134,980 | 5/1964 | Alexander | 206/389 |
| 3,453,695 | 7/1969 | Owen | 206/389 |
| 3,524,539 | 8/1970 | Herman | 206/412 |

FOREIGN PATENT DOCUMENTS 534996 10/1931 Fed. Rep. of Germany ........... 206/398

*Primary Examiner*—Joseph Man-Fu Moy
*Attorney, Agent, or Firm*—Huebner & Worrel

[57] ABSTRACT

A wound roll of a strip of fibrous material having a first end portion forming an innermost plurality of superimposed contiguous layers and a second end portion forming an outermost plurality of superimposed contiguous layers, a plurality of punctures defined in each of the end portions, each puncture being characterized by a burr projected therefrom into interlocked relation with a puncture defined in an adjacent layer, whereby the end portions of the strip are secured together in the roll.

1 Claim, 9 Drawing Figures

WOUND ROLL OF FIBROUS MATERIAL

This application is a divisional application of application Ser. No. 700,012, filed June 25, 1976, now U.S. Letters Pat. No. 4,097,983.

BACKGROUND OF THE INVENTION

1. Field of the Invention

The invention generally relates to rolls of ribbons of fibrous material, and more particularly to a helically wound roll of fibrous material, such as a ribbon of pricing labels, consisting of multiple layers secured together by a multiplicity of interlocking punctures.

2. Description of the Prior Art

In the formation of rolls of fibrous material, such as ribbons of pricing labels, it is customary to slit sheets of fibrous material, consisting of superimposed layers of backing and label paper, into narrow ribbons, perforate, and wind the resulting ribbons into rolls containing five hundred to one thousand labels or the like. Often, these rolls are completed on winding equipment which, initially, pick up the ribbons on small plastic cores which are coated with adhesive and are rotated to complete a winding operation. After winding operations have been completed, the rolls are closed through an application of adhesive to the outer layers, or, alternatively, a strip of adhesive ribbon is applied to the outermost layers for securing the end portion of the ribbon to the roll.

As can be appreciated by those familiar with the use of fibrous rolled ribbons of labels and the like, the rolls of label materials currently available often require a use of dummy cores that can readily be placed in label guns by customers, in order to facilitate a use of rolls. This, of course, tends to increase total costs in terms of time and materials. Consequently, there exists a need for improved rolls and techniques for forming coreless rolls, particularly rolls of ribbons of labels, hereinafter referred to as label ribbons, to be applied by label guns and the like.

It is therefore a general purpose of the instant invention to provide coreless rolls of helically wound fibrous material consisting of a plurality of substantially annular layers of the material, secured at its opposite ends by a plurality of punctures and interlocking burrs, and a method for forming the same, which overcomes the aforementioned difficulties and disadvantages.

OBJECTS AND SUMMARY OF THE INVENTION

It is therefore an object of the instant invention to provide an improved helically wound roll of fibrous material.

It is another object to provide a wound roll of fibrous material consisting of a plurality of substantially annular layers of a strip of fibrous material, the opposite ends thereof being secured in place by multiple, simultaneously formed, interlocking punctures and burrs resulting from the formation of the punctures.

It is another object to provide a wound roll of fibrous material consisting of a plurality of substantially annular layers of a singular strip of fibrous material having the end portions there of secured in place by a plurality of burrs projected from the layers into punctures formed in adjacent layers of the plurality.

Another object of the instant invention is to provide a roll of fibrous material, and a method of forming the same, which is particularly useful as label ribbon, although not necessarily restricted in use thereto, since the ribbon may be useful in an environment other than that in which a label ribbon is employed.

These and other objects and advantages are achieved through the provision of a roll of fibrous material formed by a method in which a ribbon of fibrous material, such as label ribbon, is impaled on at least one radially retractible pin extended from a spindle, helically wound in successive layers on the spindle, for forming a roll consisting of a plurality of concentric, contiguous layers, the innermost layers of the roll being punctured by the pin thus forming punctures in adjacent layers of the ribbon and forcing burrs to project radially into received relation with punctures simultaneously formed in adjacent layers, and thereafter closing the roll by puncturing successive outer layers of the ribbon for thus forcing burrs to project into an interlocked relation with punctures simultaneously formed in adjacent layers and thereafter removing the closed roll from the spindle, subsequent to a retraction of the pin.

DESCRIPTION OF THE PREFERRED EMBODIMENT

Figure 1:
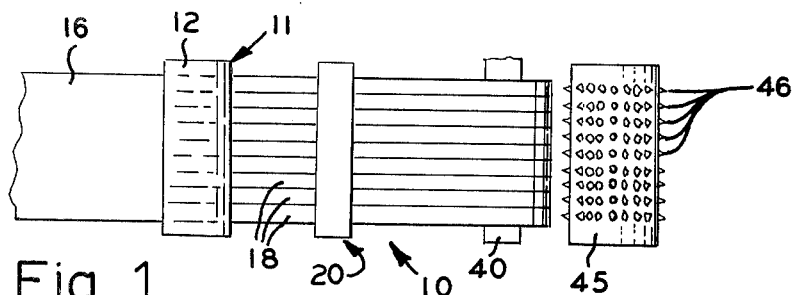
FIG. 1 is a top plan view of a schematically illustrated device particularly suited for use in performing the method and forming the roll which embodies the principles of the instant invention.

Turning now to FIG. 1, therein is schematically illustrated a device, generally designated 10, particularly suited for use in forming the roll and performing the method embodying the principles of the instant invention.

Figure 2A:
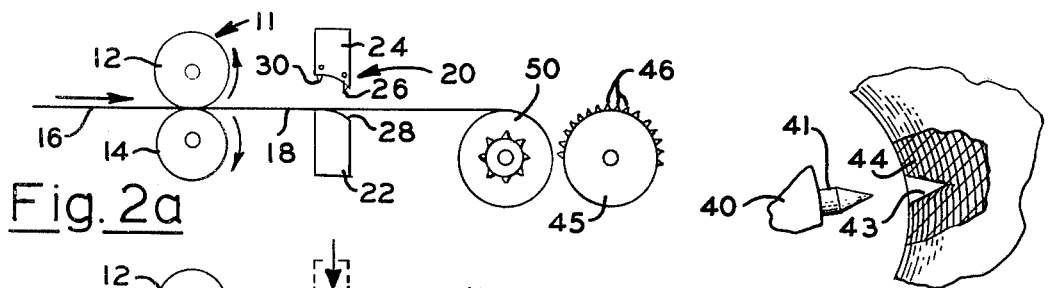
FIGS. 2a through 2c illustrate successive positions of component parts of the device assumed in performing steps of the method in which the roll is formed.
Figure 2B:
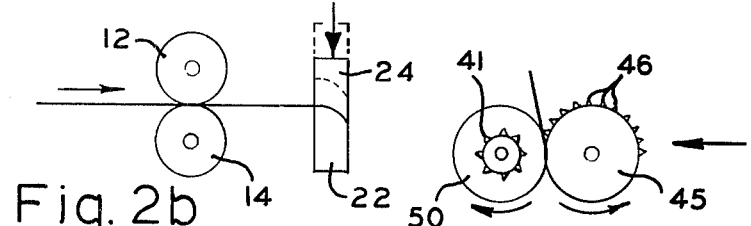
Figure 2C:
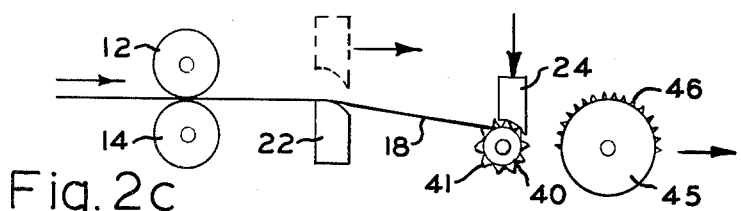

The device 10, preferably, includes a slitter 11 including a series of rotary knives 12 and a platen roll 14, FIG. 2, between which is fed a web 16 for purposes of severing the web in ribbons. The web 16, in practice, is fed from a given source, by compatible mechanisms not shown. As illustrated, the web 16 comprises a web consisting of a layer of backing paper and a layer of label paper applied thereover and secured thereto by a layer of adhesive interposed therebetween. As can readily be appreciated by those familiar with the art of forming label ribbon, the web 16 is severed into relatively narrow ribbons 18. The ribbons are typified by a width dimension of approximately one-quarter to one-half inches.

The ribbons 18 simultaneously are fed from the slitter 11 to a transfer head, designated 20. The head 20 includes a fixed platen 22 comprising a bar extended transversely beneath the ribbons 18 in a fixed relationship with the slitter 11. Extended transversely above the plurality of ribbons 18 is a translatable bar 24. This bar is supported by suitable structure, not shown, such as tracks and the like which serve to guide the bar along a path having linear segments. Suitable mechanical linkage, not shown, is provided for imparting the required motion to the bar 24.

The upper surface of the platen 22 and the lower surface of the bar 24 are of an arcuate cross-sectional configuration, each being substantially the mirror image of the other. However, it is to be noted that the lower surface of the bar 22 includes a knife edge 26 extended along the length thereof, while the platen 22 includes a linear cutting surface, designated 28, extended in registry with the knife edge 26 as the knife edge assumes the position illustrated in FIG. 2b.

Figure 3:
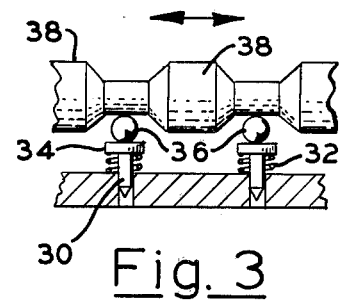
FIG. 3 is a partially sectioned, fragmented view of a pin actuating mechanism provided included in the device shown in FIGS. 1 through 2c.
Figure 4:
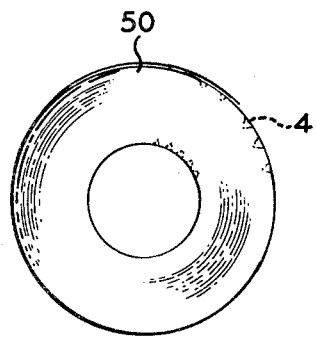
FIG. 4 is a side elevation of a roll of fibrous material which embodies the principles of the instant invention.
Figure 5:
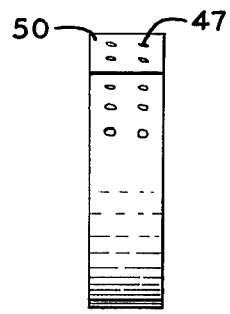
FIG. 5 is an end elevational view of the roll.

Extended downwardly from the bar 24 is a plurality of pick-up retractable pins 30 upon which the end portions of the ribbons 18 are impaled as the knife edge 26 mates with the cutting surface 28. It is to be understood that the pins 30 are actuated in a suitable manner, such as a linear cam arrangement depicted in FIG. 3. Preferably, the pins 30 extend through apertures formed in the lower surface of the bar 24 and are normally supported in a retracted position, by suitable mechanisms including springs 32, as illustrated in FIG. 3. As shown, the pins 30 include heads 34 upon which balls 36 are retained by suitable retainers, not shown. An axially reciprocable cam including a series of risers 38 is mounted in the bar 24 so that axial motion imparted to the cam causes the risers to extend the pins 30, as the balls 36 seat on the risers, and retract under the influence of the springs as the balls fall off the risers, all in a manner well understood by those familiar with such mechanical devices. In any event, it is to be understood that suitable mechanisms through which selected extension and retraction of the pins 30 is facilitated are provided.

The translatable bar 24 of the transfer head 20 serves to transfer the ends of the ribbons 18 to a spindle 40 upon which the ribbons are wound. Preferably, the spindle comprises an elongated cylinder including radially extensible pins 41 projected from its peripheral surface. The pins 41 are, preferably, supported for extension and retraction in a manner similar to that which the pins 30 are extended and retracted, employing similar mechanisms. In any event, it is to be understood that the pins 41 possess a capability of being initially extended and subsequently retracted radially from the periphery of the spindle 40 for purposes of having impaled thereon end portions of the ribbons 18. Thus a transfer of the ends of the ribbons 18 between the bar 24 and the spindle 40 is facilitated.

Transfer, of course, occurs as the pins 30 are retracted relative to the lower surface of the bar 24 and the end portions of the ribbons are impaled on the pins 41. In order to facilitate transfer suitable reliefs, not shown, are provided in the mating surface of the bar 24 and the spindle 40 for the receiving pins 30 and 41 as registry therebetween occurs.

Figure 7:
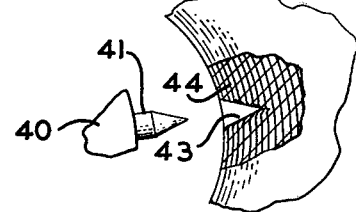
FIG. 7 is a fragmented view illustrating one manner in which punctures are formed in innermost layers of the roll, utilizing a pin depicted, for the sake of clarity, in a displaced relation with the layers.
Figure 6:
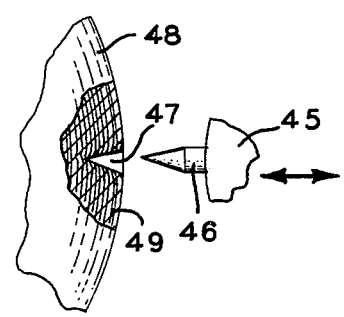
FIG. 6 is a fragmented view illustrating one manner in which punctures are formed in outermost layers of the roll.

As winding of the end portions of the ribbons 18 on the spindle 40 occurs, layers of substantially annular configurations are formed. These layers are successively punctured, as indicated in FIG. 7, by the pins 41 forming punctures 43. These punctures have projected therefrom burrs 44 which extend radially into adjacent punctures for achieving an interlocked relationship therebetween. Mounted for lateral displacement relative to the spindle 40, there is a rotatable closure platen 45 of a cylindrical configuration. The closure platen 45 also is supported by suitable structure, not shown, and includes about a segment of its periphery a plurality of radially fixed pins 46. By moving the closure roll 45 into engagement with the trailing end portions of the ribbons 18 punctures 47, FIG. 6, are formed in successive layers, designated 48. These punctures are formed in the end portions of the ribbons for thereby causing burrs 49 to extend into an interlocked relationship with adjacent punctures simultaneously formed in adjacent layers of the ribbons 18. Thus completed and closed rolls of ribbons are provided. The platen 45 now is retracted from engagement with the roll 50 which is axially discharged from the spindle 40 subsequent to a retraction of the pins 41.

OPERATION

It is believed that in view of the foregoing description, the operation of the method will readily be understood and it will be briefly reviewed at this point.

A web 16 of stock material is fed from a suitable source, not shown, to the slitter 11 in which the web 16 is severed into a plurality of ribbons 18. These ribbons are then fed to the transfer head 20, between the mating surfaces of the platen 22 and the translatable bar 24. The bar 24 is activated, initially, by causing the pins 30 to project downwardly from the lower surface thereof toward the upper surface of the platen 22. Vertical downward motion is imparted to the bar 24 causing the end portions of the ribbons 18 to be penetrated by the pin 30 and become impaled thereupon, simultaneously a severance of the ribbons between a completed roll 50 and the head 20 through coaction of the knife edge 26 and the surface 28.

Subsequent to the severance of the ribbons 18, lateral motion is imparted to the closure platen 45 for causing the pins 46 to penetrate the outermost layers 48 forming the end portion of the ribbon 18, for purposes of closing the rolls 50. Closing of the rolls 50 occurs as the pins 46 penetrate the successive layers 48 for forcibly forming punctures 47 and causing burrs 49 to penetrate into adjacent punctures formed in adjacent layers 48. Consequently, an interlocked relationship between the layers 48 is achieved as the burrs 49 extend between the punctures 47.

The closure platen 45 is now retracted simultaneously with a retraction of the pins 41.

With the pins 41 retracted, the coaxially aligned completed rolls 50 are "kicked-off" the spindle 40, employing any suitable means, and another cycle of operation is initiated.

In view of the foregoing, it should readily be apparent that through the instant invention there is provided rolls coreless of fibrous material, such as, for example, label ribbons, which are practical and economic to employ.

Although the invention has been shown and described in what is conceived to be the most practical and preferred method and apparatus, it is recognized that departures may be made therefrom within the scope of the invention, which is not to be limited to the illustrative details disclosed.

Having described my invention, what I claim as new and desire to secure by Letters Patent is:

1. A length of single ply fibrous material such as label ribbon and the like wound into a coreless roll comprising: a fibrous ribbon wound into a multiplicity of contiguous, radially successive, concentric layers forming a roll of an annular configuration consisting of a plurality of inner layers disposed near the center of the roll and a plurality of outer layers disposed near the periphery of the roll, first locking means for establishing an interlocking relationship between the inner layers of the roll, and a second locking means for establishing an interlocking relationship between the outer layers of the roll, each of said locking means comprising a plurality of punctures and a plurality of burrs, each puncture of said plurality of punctures being formed in a layer of a plurality of radially successive layers of the roll and disposed in registry with adjacent punctures, and each burr of said plurality of burrs being integrally related to and projected from a layer of said plurality of radially successive layers of the roll and received in an interlocking relationship with a plurality of said punctures.

* * * * *

UNITED STATES PATENT AND TRADEMARK OFFICE
CERTIFICATE OF CORRECTION

PATENT NO. : 4,177,897
DATED : December 11, 1979
INVENTOR(S) : Terrell A. Cole

It is certified that error appears in the above–identified patent and that said Letters Patent are hereby corrected as shown below:

Column 1, line 63, delete "there of" and insert ---thereof---.

Column 4, line 54, delete "rolls coreless" and insert ---coreless rolls---.

Signed and Sealed this

Eighteenth Day of March 1980

[SEAL]

Attest:

SIDNEY A. DIAMOND

Attesting Officer

Commissioner of Patents and Trademarks